United States Patent
Chang et al.

(10) Patent No.: US 6,486,217 B2
(45) Date of Patent: *Nov. 26, 2002

(54) THROAT AND CONE GAS INJECTOR AND GAS DISTRIBUTION GRID FOR SLURRY REACTOR (CJB-0004)

(75) Inventors: Min Chang, Warren, NJ (US); Constantine Anastasios Coulaloglou, Randolph, NJ (US); Edward Ching-Sheng Hsu, Bridgewater, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/738,844

(22) Filed: Dec. 15, 2000

(65) Prior Publication Data

US 2001/0018462 A1 Aug. 30, 2001

Related U.S. Application Data

(60) Continuation-in-part of application No. 09/473,514, filed on Dec. 28, 1999, now Pat. No. 6,199,835, which is a division of application No. 08/955,130, filed on Oct. 21, 1997, now Pat. No. 6,076,810.

(51) Int. Cl.[7] ............................................. C07C 27/00
(52) U.S. Cl. ........................ 518/700; 518/705; 518/706
(58) Field of Search ................................. 518/700, 705, 518/706

(56) References Cited

U.S. PATENT DOCUMENTS 5,905,094 A * 5/1999 Chang et al. ................ 518/700

* cited by examiner

Primary Examiner—Jafar Parsa
(74) Attorney, Agent, or Firm—Charles J. Brumlik

(57) ABSTRACT

A gas distribution grid for a slurry reactor includes a plurality of gas injectors horizontally arrayed across, and extending through, an otherwise gas and liquid impervious plate. The injectors have a throat open at both ends, with a gas pressure reducing bore at one end which is the entrance end and with the other end opening into an upward opening cone. Flow diverting means in the injectors prevents slurry solids from entering the throat and being attrited by the high velocity gas jet exiting the bore into the throat. It is preferred that the gas injectors not protrude above the top surface of the grid and flat space is eliminated by means such as angular fillers, to prevent solids accumulation top of the grid. A chamber may be present at the junction of the bore and throat to prevent unrestricted expansion of the gas jet entering the throat. This is useful for injecting gas into a reactive hydrocarbon synthesis slurry in a slurry reactor, with reduced catalyst attrition and deactivation.

4 Claims, 4 Drawing Sheets

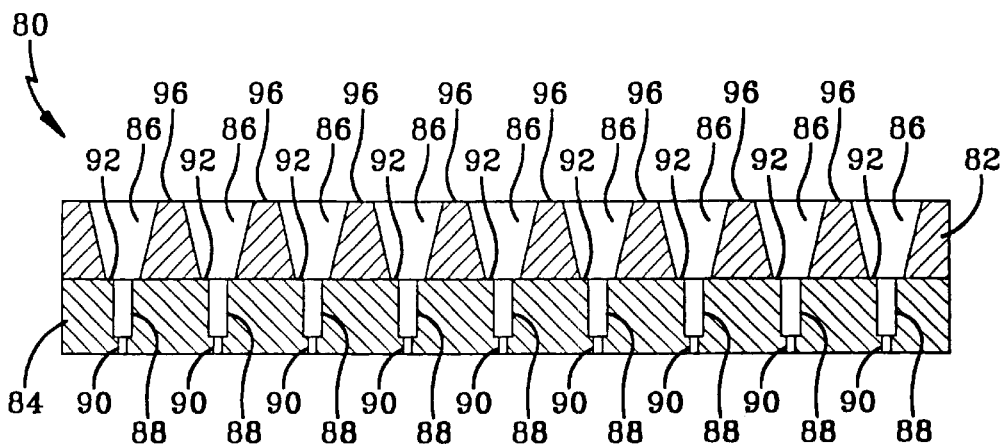
FIG-7(a)
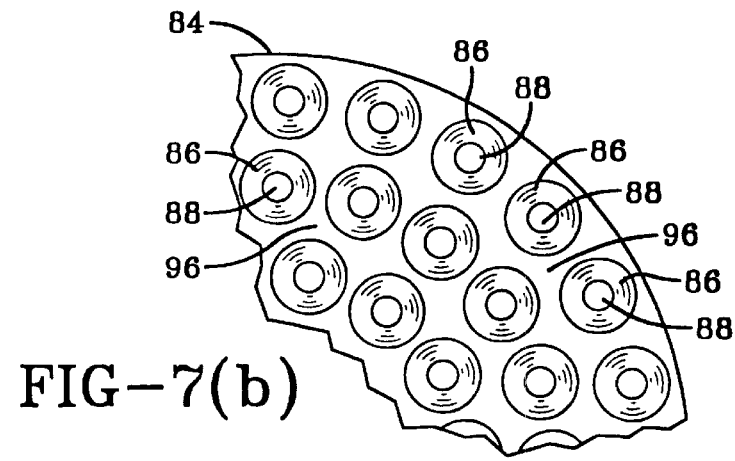
FIG-7(b)
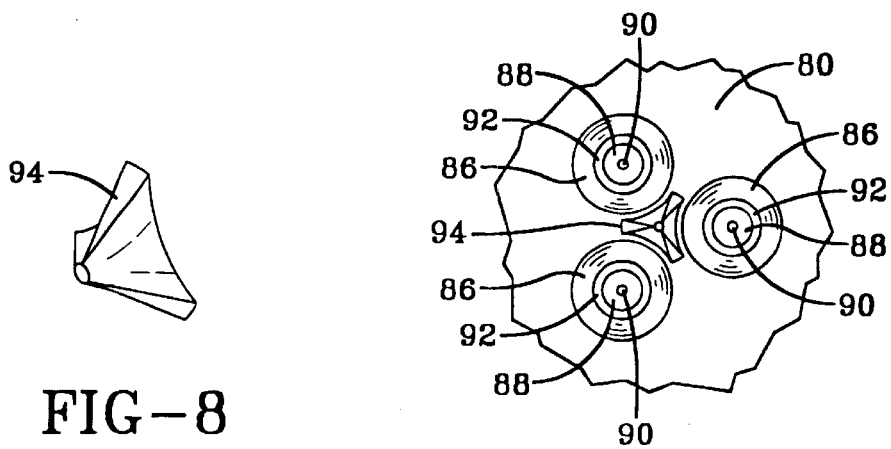
FIG-8
FIG-9

THROAT AND CONE GAS INJECTOR AND GAS DISTRIBUTION GRID FOR SLURRY REACTOR (CJB-0004)

This application is a Continuation-in-Part of U.S. Ser. No. 09/473,514 filed Dec. 28, 1999, now U.S. Pat. No. 6,199,835, which is based on a Divisional of U.S. Ser. No. 08/955,130 filed Oct. 21, 1997, now U.S. Pat. No. 6,076,810.

FIELD OF THE INVENTION

The invention relates to a throat and cone injector and a gas distribution grid containing same. More particularly, the invention relates to a throat and cone gas injector and to a gas distribution grid containing a plurality of these injectors useful for injecting a gas into a slurry which contains particulate solids, with reduced solids attrition and injector plugging.

BACKGROUND OF THE INVENTION

There are many applications in which a gas must be injected up into a slurry which comprises particulate solids in a liquid. These include coal liquefaction, resid refining, other hydrogenation processes, slurry hydrocarbon and oxygenate synthesis, waste water treating, etc. The gas is typically injected up into the slurry by means of a horizontal gas distribution grid, which is also referred to as a plate or tray, located at the bottom of the slurry in a rector or other vessel, and over a gas space or cavity called a plenum. The tray contains a plurality of gas injectors extending therethrough for uniformly distributing the gas up into the slurry. These gas injectors can be vertical holes in the tray, bubble caps, and the like as is well known. Problems associated with these trays include solids attrition and plugging of the injectors if the gas pressure drops. While solids plugging of the gas injectors is never desirable, in some applications it is also important to avoid solids attrition. One specific example is a slurry hydrocarbon synthesis (HCS) process in which a synthesis gas (syngas) comprising a mixture of $H_2$ and CO is bubbled up into and through a slurry in a reactor at reaction conditions effective to convert the syngas to hydrocarbons, at least a portion of which are liquid at the reaction conditions. In this process, the slurry comprises solid catalyst particles and gas bubbles in a hydrocarbon slurry liquid, with the slurry liquid comprising liquid HCS products. Reactors which contain a three phase slurry are sometimes referred to as slurry "bubble columns", as is disclosed in U.S. Pat. No. 5,348,982. The amount of syngas injected up into the slurry to provide the desired level of hydrocarbon synthesis is typically more than that needed to keep the catalyst particles dispersed in-the liquid. Problems encountered with this (and other processes) include plugging of the gas injectors by the catalyst particles, catalyst particle attrition by the gas which produces fines and results in catalyst loss and plugging units downstream of the reactor, deactivation of catalyst settling on the flat spaces on the tray and catalyst falling down through the injectors into the plenum space below. It would therefore be an improvement to the art to use gas injecting means which reduce or eliminate any of these problems.

SUMMARY OF THE INVENTION

The invention-relates to a gas injecting means useful for injecting gas into a slurry containing particulate solids, with reduced solids attrition and injector plugging. More particularly the invention relates to a throat and cone gas injector and to a gas distribution grid comprising a plurality of the gas injectors horizontally arrayed or distributed across, and vertically extending through, an otherwise gas and liquid impervious horizontal plate or tray, which will typically be located at the bottom of the slurry. In one embodiment, all or a portion of the gas injectors are formed as an integral part of the grid. The gas injector comprises a throat or elongated, hollow, first gas expansion zone open at both ends, with one end being a gas entrance having a bore through which gas is passed from outside the jet, past an orifice which is the exit of the bore, and into the throat, with the other, downstream end opening into an upwardly and outwardly extending second gas expansion zone, which may be cone-shaped. An internal shoulder at the junction of the throat and cone provides a flow diverting means, which directs slurry seeping down along the wall of the cone radially inward into the gas jet exiting the throat, to prevent slurry solids attrition and throat plugging. In a typical injector of the invention, the inner diameter of this shoulder is substantially the same as that of the throat and its outer diameter peripherally terminates at the inner wall of the bottom of the cone. It has been found that the absence of the shoulder, or flow diverting means in the gas injector, can result in significant and substantial disintegration of the particulate solids into fine particle sizes by attrition. These fines are carried up and out of the reactor in the overheads, and also pass through liquid filters into downstream units. This results in a continuous and substantial loss of catalyst and also forms sludge in downstream units which can clog the units and which must eventually be separated from the product. The pressure drop through the bore is determined by its diameter or cross sectional area, which is smaller than that of the throat. The aspect ratio and diameter of the throat are sized to (i) insure that the expanding gas jet flowing up through the throat contacts the inner throat wall before it exits the throat and enters the cone and, in combination with the orifice diameter. (ii) achieve the desired gas velocity in. the cone where it contacts the slurry. This wall contacting in the throat is important to obtain a more uniform velocity profile of the gas stream entering the cone by allowing the velocity at the outer periphery of the gas jet to fully develop and to prevent flow perturbations and irregularities at the outer periphery of the jet which might otherwise result in solids weeping down into the throat, where they will be attrited by the higher velocity gas jet entering the throat through the narrow, smaller orifice. The throat has a length to diameter ratio (aspect ratio) of less than 10:1 and preferably less than 8:1 to prevent throat plugging by slurry solids. This aspect ratio must also be large enough for the outer periphery of the expanding gas jet to contact the inner wall of the throat before exiting it, and preferably make the contact a finite distance upstream of the throat exit, to provide a margin of safety (e.g., at least 10% of the throat length). It is preferred that the longitudinal axis of the bore, throat, shoulder and cone all be coincident. The angle of the interior cone wall is preferably greater than the angle of repose of the slurry solids, to prevent solids build-up in the cone. While in a preferred embodiment, the bore, throat, shoulder and cone all have a circular cross-section perpendicular to their longitudinal axis, other cross-sections may be employed if desired. A plurality of these injectors, vertically extending through and horizontally arrayed or arranged across a horizontal and otherwise gas and liquid impermeable plate or tray at the bottom of the slurry, uniformly distribute gas up into the slurry, with a fairly uniform pressure drop and concomitant uniform gas injection velocity across and through each gas injector in the tray. This is determined by the desired gas throughput into the slurry, the number of injectors in the tray, the diameter of the injector bore, and the gas pressure upstream of the injector bore.

Close packing of the injectors across the grid will substantially reduce the amount of flat surface on the top of the grid. In a further embodiment, no part of the injector extends up past the top of the grid plate. These two features minimize the amount of dead space on the grid for slurry solids to settle on. In the case of a slurry hydrocarbon synthesis (HCS) process in which at least a portion of the solids are an HCS catalyst, the reduced solids settling results in less catalyst deactivation. The gas distribution grid is typically located above the synthesis gas (syngas) reservoir or plenum area at the bottom of the reactor. The syngas feed is passed into a plenum under the grid which serves as a pressure damper and which, in combination with the diameter of the orifice in the gas jets, the number of jets and gas pressure, insures that the amount of syngas entering each injector in the grid is the same.

Gas passing through the pressure reducing bore and into the throat or first expansion zone, exits the orifice as a radially outwardly expanding gas jet which flows through the throat and contacts the inner wall before it enters the cone. This contact is important, as it results in more energy being directed to the outer periphery of the jet exiting from the throat and into the cone, or second expansion zone. This provides sufficient gas velocity and mass (energy) at the periphery of the jet exiting the throat to prevent slurry from seeping down into the throat where the solids can be attrited into fines by the relatively high velocity gas jet entering the throat from the bore. It also reduces the difference in gas velocity between the outer periphery and the center of the jet, which further reduces particle attrition when the gas contacts the slurry. As the gas jet exits the throat, it doesn't contact the inner cone wall at the throat and cone junction, because of the annular shoulder. In one embodiment, the inner periphery of the shoulder is adjacent the inner wall of the throat at its exit and the outer diameter peripherally terminates at the inner cone wall at the bottom of the cone. The shoulder acts as a flow diverter for slurry seeping down the wall of the cone by imparting a radially inward direction to the downflowing slurry. Slurry which flows down along the interior cone wall reaches the shoulder, which forces the downcoming slurry radially inward to where it meets the upflowing, expanding gas jet exiting the throat, which carries weeping the slurry back up into the slurry body above. As the expanding gas jet travels up through the cone, it contacts the slurry and breaks up into bubbles which have a net upward velocity greater than can be achieved with bubble caps and the like. In a further embodiment, the orifice opens into a cone or chamber, or other means (depending on the shape of the orifice and throat) which prevents unrestricted expansion of the gas jet as it enters the throat, thereby preventing back swirls and eddies from forming which can be drawn into the expanding gas jet and disturb or cause perturbations, such as ripples, and other flow disturbances at the outer jet periphery as it travels up the throat and into the cone and also cause fluctuations in the jet itself Such perturbations can permit slurry solids to weep down into the throat where they are attrited by the incoming higher velocity gas jet. The cone or chamber thus stabilizes the expanding gas jet and has also been found to be beneficial in clearing the throat of solids due to reductions in the gas flow.

BRIEF DESCRIPTION OF THE DRAWINGS

FIG. 5(a) illustrates an expanding gas jet exiting the orifice and contacting the wall of the throat with a free expansion zone proximate the orifice, while

FIGS. 7(a) and 7(b) respectively schematically illustrate a side view and a top plan view of an embodiment of a short cylindrical gas distribution grid.

FIG. 8 is a perspective of an arcuate, pyramidal spacer for eliminating flat areas on the top of the grid.

FIG. 9 is a top plan view of a portion of a grid showing the location of the pyramidal spacer.

DETAILED DESCRIPTION

Figure 1:
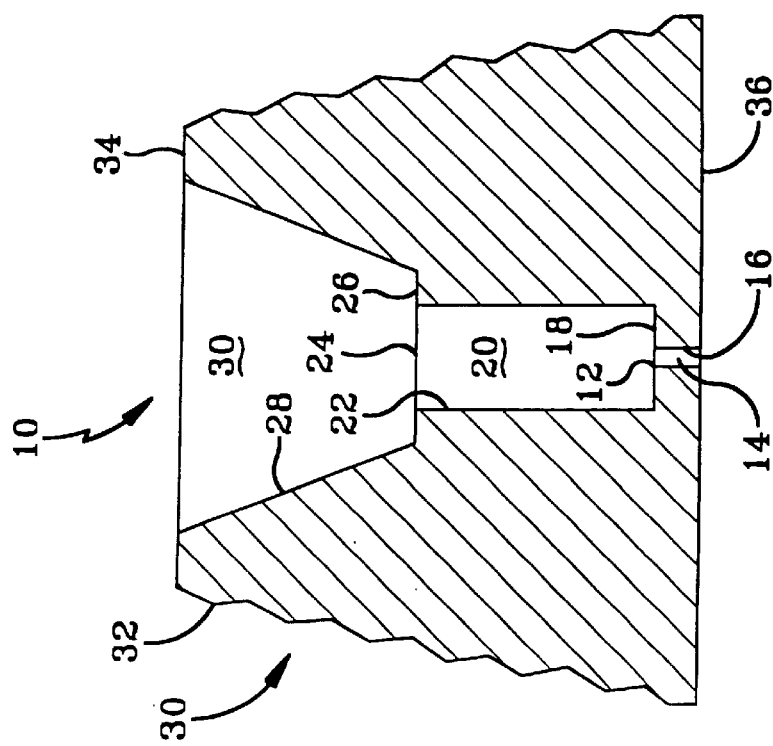
FIG. 1 is a partial cross-sectional schematic of a gas injector of the invention as an integral part of a gas distribution grid.

Referring to FIG. 1, a gas injector of the invention 10 is illustrated as an integral part of a slurry reactor gas distributor grid 30 comprising a horizontal, disk-shaped steel plate 32, shown in partial form, which contains a plurality of gas injectors horizontally arrayed across the tray and extending vertically therethrough, of which only the one, 10, is shown for the sake of convenience. The top and bottom of the grid or plate are indicated at 34 and 36. The gas injector 10 extends vertically through the plate and comprises a cylindrical bore 14 defined by peripheral wall 16 which opens into a throat 20 through an orifice 12 which is the upper end of bore 14. The orifice opens up into throat 20 by means of shoulder or chamber 18. While shoulder 18 is shown as horizontal and flat which means that orifice 12 is a sharp-edged orifice, in one embodiment it opens upward and outward from the perimeter of the orifice to the inner throat wall 22 as is explained below. In the latter case, the angular opening or chamber extending from the orifice inhibits unrestricted expansion of the gas jet exiting the orifice up into the throat. Throat 20 is a cylindrical bore defined by a peripheral wall 22. Gas passes through bore 14 and emerges out of the upper end of the bore, which is the orifice, into throat 20 as a cone shaped, expanding gas jet which is illustrated in FIG. 5 and explained in detail below. Passage of the gas through the bore reduces its pressure, so that the gas pressure in the throat is less than that upstream of the bore (e.g., in the plenum below the grid). The gas jet entering the throat has an included angle ranging from about 10–20 degrees and more typically 15–20 degrees, as is known by those skilled in the art. The velocity of the expanding gas jet is reduced as it passes up through the first expansion zone or throat 20. The aspect ratio or length to diameter ratio of throat 20 is sized to permit the desired velocity reduction of the jet and, at the same time, insure that the expanding gas jet contacts the peripheral inner wall 22 of the throat, before it exits the throat at 24 and enters up into the second gas expansion zone or cone 30. In general, the aspect ratio will be at least 2 to insure that the expanding gas jet contacts the wall of the throat. On the other hand the maximum aspect ratio should not be larger than 8 or 10, to prevent throat plugging by the slurry solids, in the event of a reduction in gas flow. In the event of a reduction of the upstream gas pressure or a temporary cessation of the gas flow, the injector will fill up with the slurry solids and it has been determined that an aspect ratio greater than about 8 or 10 can prevent the gas from pushing out the solids when the pressure is restored, thereby plugging the injector and rendering it inoperable. It is also preferred that the expanding gas jet contact the throat wall sufficiently upstream of the throat exit to provide a factor of safety which can range anywhere from about 25% to about 75% of the throat length. As mentioned above, this contacting is an essential feature of the gas injector of the invention to insure sufficient gas velocity proximate the wall 22 at the throat exit 24, to prevent slurry weeping down the side of the cone from entering the throat. This also results in a more uniform horizontal gas velocity profile flow across the top or exit 24 of the throat. Throat 20 opens into the radially upward and outward extending second gas expansion zone 30 at the horizontal circumferential flow diverting means illustrated as an annular shoulder 26. Zone 30 is a cone-shaped. and more specifically frusto-conical as defined by the frusto-conical peripheral wall 28 cut into the upper portion of the tray. In zone 30, the gas velocity is further reduced down to a level where it will not cause catalyst particle attrition. yet still be high enough to suspend the solids in the slurry and, in the case of a slurry reactor, provide a gas flow rate sufficient to achieve the desired reactor output. In the case of injecting synthesis gas into a slurry hydrocarbon synthesis reactor, the gas flow rate required for efficient hydrocarbon synthesis is typically greater that that required for catalyst suspension. The expanding gas jet contacts the slurry in zone 30 and breaks up into bubbles which rise up through the slurry. Slurry weeping down along the interior of the cone along wall 28 reaches shoulder 26 which imparts a radially inward direction and velocity to it and, as a consequence, the slurry is directed into the gas steam flowing up out of the throat exit 24. This lifts the downflowing slurry back up and into the slurry body above, while minimizing seeping of the slurry down into the throat where it will be attrited. It has been found that the use of the shoulder can result in as much as a twenty fold reduction in catalyst attrition. While it is believed that the most efficient cross-section of the orifice, throat and cone is circular, it is possible that in sane cases one or more of these elements will have a cross-section other than circular. In the case of a cross-section other than circular, the diameter is taken as the equivalent diameter which is the square root of the cross-sectional area divided by pi, and the equivalent diameter is used in determining the aspect ratio of the throat.

Figure 2:
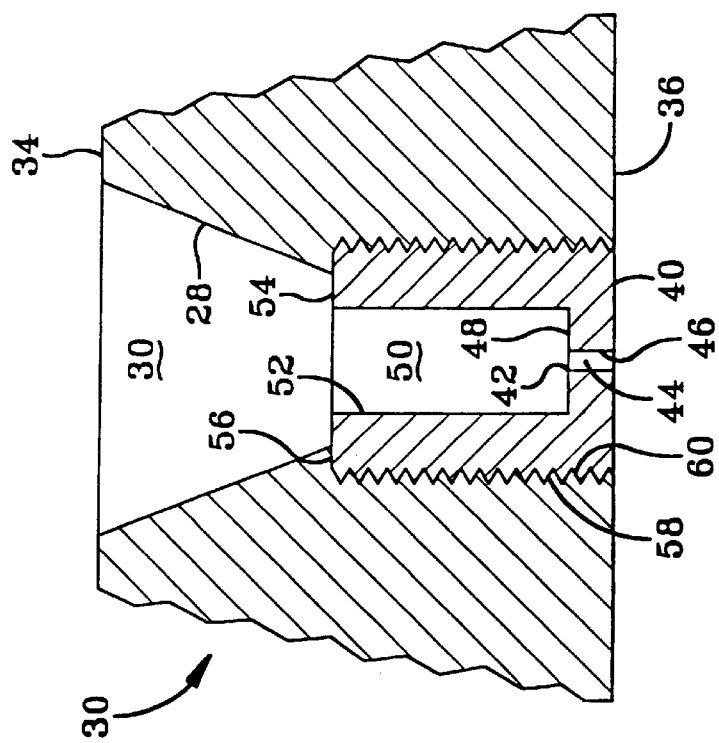
FIG. 2 is a variation of the embodiment of FIG. 1.
Figure 3:
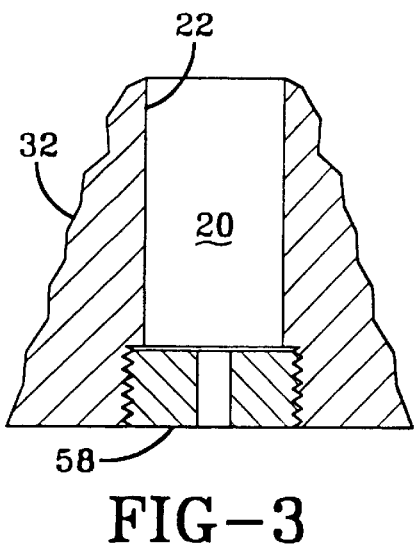
FIG. 3 briefly illustrates a replaceable orifice assembly for a gas injector of the invention.
Figure 4:
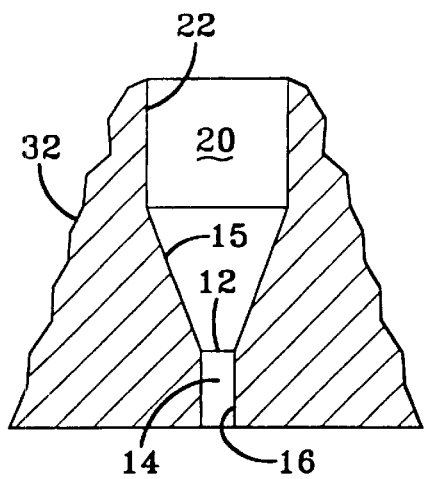
FIG. 4 schematically shows the orifice opening up into a cone or chamber at the bottom of the throat of the gas injector.
Figure 5A:
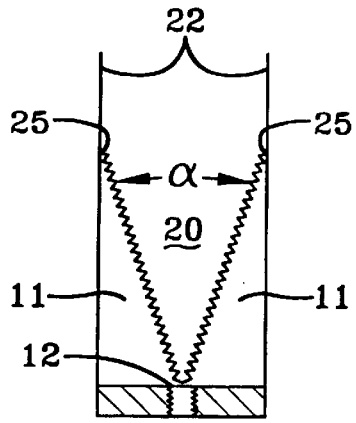
Figure 5B:
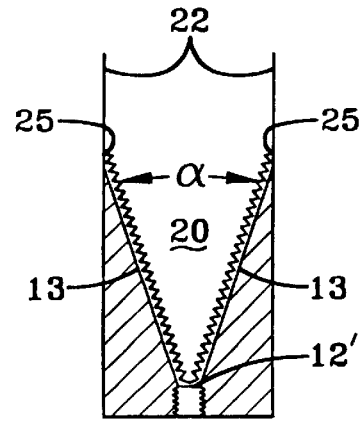
FIG. 5(b) shows the orifice opening out into a cone or chamber to eliminate the free expansion zone of FIG. 5(a).

FIG. 2 illustrates an embodiment of the invention similar to that of FIG. 1, but differs in that the bore and throat are a single, cylindrically shaped and externally threaded assembly 40 screwed into a mating threaded bore in the tray, indicated by screw threads 58. The bore 44, bore wall 46, orifice 42, throat 50 and wall 52 are identical to those shown in FIG. 1. However, the inner portion of the top 54 of cylinder 40 forms the flow diverting shoulder at the junction of the throat and cone. Assembly 40 screws up into the tray to where it meets with annular shoulder 56 at the bottom of the cone. That portion of the top of the cylinder 40 which does not contact the shoulder 56 forms the annular flow diverting means. Thus, in this embodiment the orifice and throat assembly are removably or detachably attached to the tray for facile replacement. Other embodiments will be apparent to those skilled in the art, such as a replaceable orifice assembly briefly illustrated in FIG. 3 and the like. Thus, in FIG. 3, a replaceable orifice assembly 58 is screwed up into a mating bore at the bottom of throat 20. FIG. 4 illustrates still another embodiment in which the bore 14 of FIG. 1 opens up into throat 20 by means of a chamber or cone shaped wall 15. In this embodiment, the expanding gas jet exiting up out of orifice 12 is prevented from freely expanding out to the throat wall 22 proximate to the orifice 12 as it does in the embodiment of FIG. 3. by the cone or chamber. This is illustrated in FIGS. 5(a) and 5(b). Thus, in FIGS. 5(a) and 5(b) an expanding, conical gas jet indicated as two wavy lines having an included angle $\alpha$, exits orifice 12 and 12' and contacts the inner, cylindrical wall 22 of throat 20 at 25. In FIG. 5(a), space 11 surrounding the sharp-edged orifice 12 permits free expansion of part of the gas jet. Free expansion of the gas jet exiting orifice 12' is prevented by the cone or chamber shaped wall 13 in the embodiment of FIG. 5(b). It has been observed that the presence of a cone or chamber proximate the orifice prevents perturbations in the gas flow at the outer periphery of the expanding gas jet and also enables the gas to more easily blow out solids that may have filled up the throat during a lowering or cessation of the gas pressure upstream of the orifice. The cone angle should be determined experimentally for each case, but, in general, it will have an included angle less than the angle of repose of the solids in the slurry, to prevent slurry solids build-up on the interior cone wall. Generally, the included angle will be less than 140 degrees and in some embodiments, will be less than 90 degrees.

Figure 6:
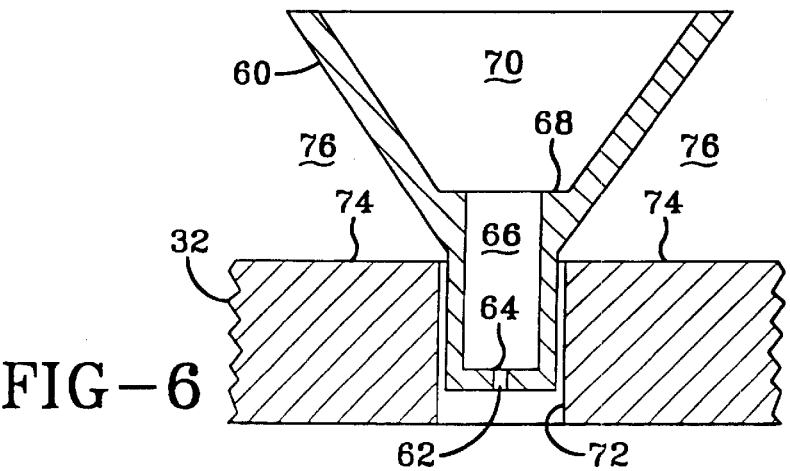
FIG. 6 schematically illustrates, in partial cross section, of another embodiment of a gas injector and grid of the invention.

Referring now to FIG. 6, a gas injector of the invention is shown being similar in most respects to that of FIG. 1, except it is not an integral part of a gas distribution tray. In this embodiment, the gas injector is a separate unit which is attached, by suitable means (e.g., screw threads) not shown, to a mating bore 72 extending through the tray from top to bottom. Thus, turning to FIG. 6, gas injector 60 comprises a cylindrical bore 62 which defines orifice 64 at its downstream end. Orifice 64 opens up into a larger diameter cylindrical bore 66 which is the throat or first expansion zone. Bore 66 opens up into a second, hollow, conical expansion zone 70 by means of annular shoulder 68, which is the slurry radial flow diverting means. The angle of the cone is less than the angle of repose of the solids in the slurry, to prevent solids accumulation on the inner cone wall. In this embodiment, even when a plurality of such injectors are horizontally arrayed across the surface of the tray, for each injector there will be an annular, flat surface on top of tray 32 below the cone, indicated at 74 for injector 60. In the case where the slurry solids comprise catalyst particles which deactivate when not in contact with the uprising gas, this space and the area 76 above 74 bound at the top by the cone is a dead space, in which catalyst particles will accumulate and deactivate. Hence, in such cases an embodiment similar to that of FIG. 1 or 2 is preferred, unless other means are used to block off the dead space or pass gas through it to prevent catalyst accumulation.

FIGS. 7(a) and 7(b) respectively schematically illustrate a side view and a top plan view of an embodiment of a short cylindrical gas distribution grid or tray according to the invention, in which the grid contains a plurality of gas injectors of the invention horizontally arrayed across and extending through the grid in a manner similar to that shown in FIG. 1. However, in this embodiment the grid is formed of two separate circular, or disk-shaped plates 82 and 84, assembled and held together by suitable means such as screws or bolts (not shown). Upper plate 82 of the grid contains a plurality of conical cavities 86 extending therethrough which make up the second gas expansion zone for each injector. Lower plate 84 contains respective concentric mating throat and orifice cavities, indicated briefly as 88 and 90, extending through it and being coaxial with the longitudinal axis of each cone as shown. The throat diameter is smaller than the bottom of each respective and mating conical cavity in the top plate 82, so that the annular shaped flow diverting shoulder 92 is formed when the top and bottom plates are joined to form the completed grid. The top plan view is shown in greater detail in FIGS. 7(b) and 9 explained below. No matter how close each cone is to its adjoining neighbors, there must be a flat space on top of the tray between the cones which is indicated as 96 in FIG. 7(b). This space, on which catalyst will settle and deactivate, is readily reduced and even eliminated by an arcuate, pyramidal spacer 94 illustrated in perspective in FIG. 8 and in plan view in FIG. 9. In the embodiment shown, the top of the spacer is slightly flat and suitable means, such as a rounded top screw (not shown) is used to fasten the spacer onto the flat spaces. FIG. 9 shows more detail for the spacer and for the plan view of the injectors.

Figure 10:
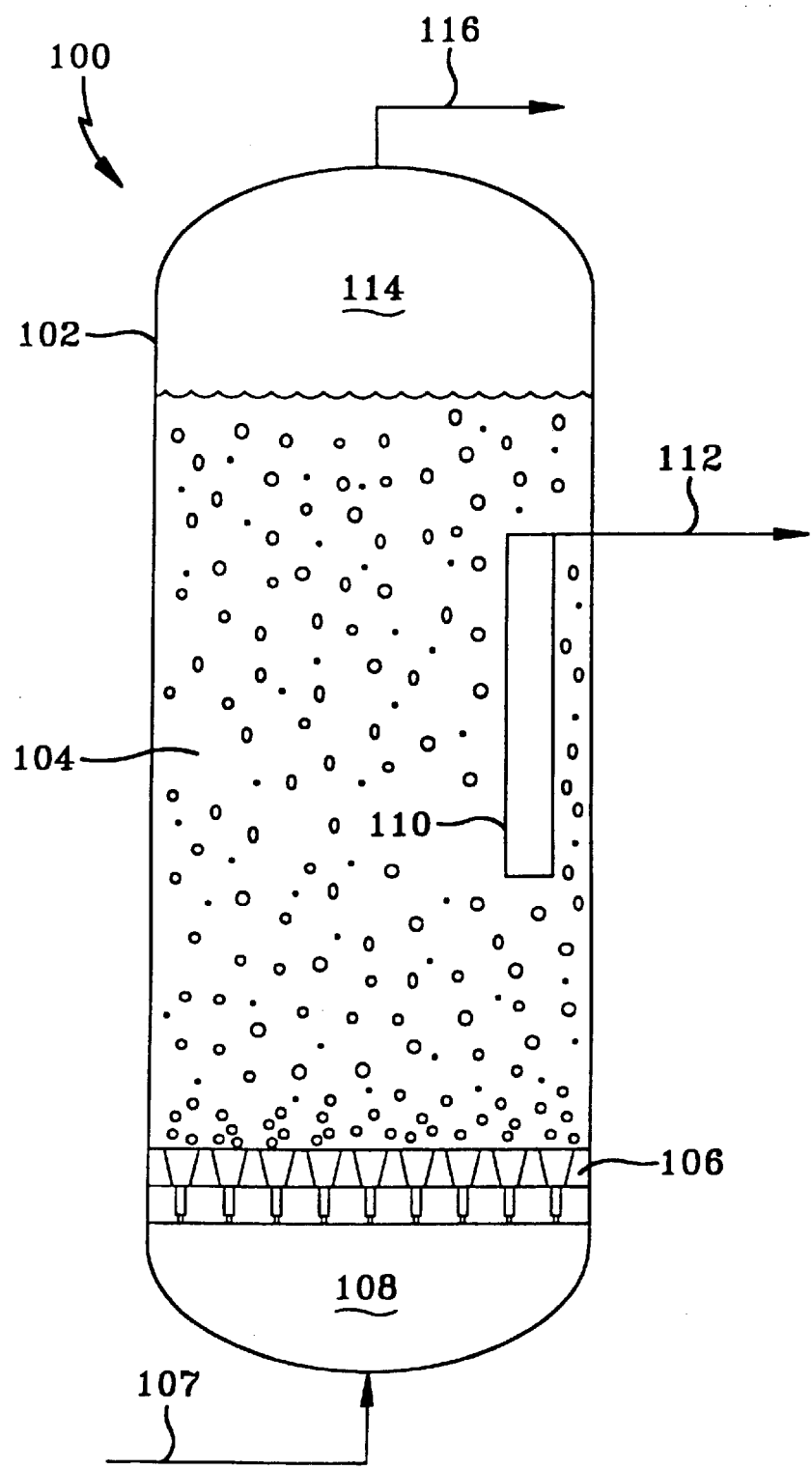
FIG. 10 is a simplified cross-sectional schematic of a slurry hydrocarbon synthesis reactor containing a gas distributing grid of the invention.

FIG. 10 is a simple cross-sectional schematic of a slurry HCS reactor useful in the process of the invention containing a gas distribution grid of the invention which is that illustrated in FIG. 7. Turning to FIG. 10, there is shown a slurry HCS reactor 100 comprising a cylindrical shell 102 containing a slurry 104 within, which is supported by a gas distribution grid 106 of the invention of the type illustrated in FIG. 7, except that for the sake of simplicity the gas injectors are not shown in great detail. The grid comprises one or more circular metal plates horizontally disposed over the plenum space 108 which supports the slurry above and which contains a plurality of the gas injectors. horizontally arranged across the flat horizontal surface of the grid and extending vertically therethrough. The outer periphery of the grid forms a seal with the inner surface of the reactor. The hollow space or plenum 108 under the grid is both a gas reservoir and a damper to smooth out fluctuations in the feed gas pressure. The syngas feed enters the reactor in the plenum space 108 via feed line 107 and is distributed up into the slurry 104 through the gas injectors extending through the grid. The small circles represent gas bubbles and the solid circles the catalyst particles. A filtration means simply illustrated by box 110 immersed in the slurry separates the liquid hydrocarbon products of the synthesis reaction from the catalyst particles, with the liquid being withdrawn via line 112 and passed to further processing and upgrading. A liquids and solids disengaging space 114 in the top of the reactor collects the gas products of the hydrocarbon synthesis reaction and the unreacted syngas and passes them out of the reactor as tail gas via line 116 to further processing and product recovery and upgrading. By way of an illustrative, but non-limited example, for a thirty foot diameter reactor, the grid may contain as many as ten thousand gas injectors with a pressure drop of up to about twenty pounds per square inch across each injector.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

The present invention can be used in a Fischer-Tropsch process or in a methanol synthesis process or other CO hydrogenation processes. In the three-phase slurry of a Fischer-Tropsch process, the catalyst attrition can be minimized by use of the gas injector of the present invention. The Fischer-Tropsch process with gas injector of the present invention is particularly useful for the selective production of paraffin wax.

What is claimed is:

1. A CO hydrogenation process wherein a gas is injected into a reactor through a gas injector, wherein the improvement comprises:

passing the gas through a pressure reducing zone having a first gas entrance end and a first gas exit end, the reducing zone terminating at the first gas exit end in an orifice which opens into an entrance of an elongated, longitudinal first gas expansion zone;

passing the gas through the first gas expansion zone having a second gas entrance end and a second gas exit end, the second gas entrance end and the second gas exit end being at opposite ends of its longitudinal axis, an inner wall and a substantially constant cross-sectional area perpendicular to the axis, which area is larger than that of the orifice;

passing the gas through the exit end of the first gas expansion zone opening into a third gas entrance of a second gas expansion zone having the third gas entrance end and a third gas exit end at opposite ends of its longitudinal axis, an inner wall and a cross-sectional area perpendicular to the axis that increases from the third gas entrance to the third gas exit; and introducing the gas from the third gas exit into the reactor.

2. A CO hydrogenation process according to claim 1, wherein the process is a Fischer-Tropsch process.

3. A Fischer-Tropsch process according to claim 2, wherein the gas is introduced into the reactor to make a three phase slurry comprising catalyst, such that catalyst attrition is minimized by use of the gas injector.

4. A Fischer-Tropsch process according to claim 2, wherein the process is the selective production of paraffin wax.

\* \* \* \* \*